United States Patent [19]

Inagaki et al.

[11] Patent Number: 4,913,130
[45] Date of Patent: Apr. 3, 1990

[54] SOLAR COOKER ASSEMBLY

[75] Inventors: Jitsuo Inagaki, Aichi; Sinji Sawata, Tokyo, both of Japan

[73] Assignee: Agency of Industrial Science and Technology, Tokyo, Japan; a part interest

[21] Appl. No.: 340,530

[22] Filed: Apr. 19, 1989

[30] Foreign Application Priority Data

Apr. 21, 1988 [JP] Japan .................................. 53-96832

[51] Int. Cl.⁴ ............................................... F24J 2/38
[52] U.S. Cl. .................................. 126/424; 126/440; 126/451
[58] Field of Search .................. 126/424, 440, 451

[56] References Cited

U.S. PATENT DOCUMENTS

| | | | |
|---|---|---|---|
| 2,806,134 | 9/1957 | Tarcici | 126/451 |
| 4,337,759 | 7/1982 | Popovich et al. | 126/440 |
| 4,459,974 | 7/1984 | Lang | 126/440 |
| 4,587,952 | 5/1986 | Richardson | 126/424 |
| 4,723,535 | 2/1988 | Lew | 126/441 |

Primary Examiner—Carroll B. Dority
Attorney, Agent, or Firm—Donald W. Hanson

[57] ABSTRACT

This invention relates to a solar cooker assembly comprising a circular and convex Fresnel lens having its convex side facing either upward or downward, a protective frame unit rigidly fitted to the periphery of said Fresnel lens, a support unit for swingably supporting said Fresnel lens so that the elevation and the aximuth of the lens can be freely chosen without restriction and a cooking unit located at the focal point of said Fresnel lens.

5 Claims, 8 Drawing Sheets 4,913,130

SOLAR COOKER ASSEMBLY

BACKGROUND OF THE INVENTION

This invention relates to a solar cooker assembly and more particularly to a solar cooker assembly which is provided with a Fresnel lens for focusing and can be disassembled, reassembled and transported with ease.

There is known a cooker assembly that utilizes solar energy having a configuration as shown in FIG. 9. In this assembly a lower rod frame 1 and an upper rod frame 2 are connected together by means of rods 3 and angular rods 4, 4' which tiltably support a lens rigidly fitted to said upper rod frame 2, a lens frame 5 being removably connected to the top of said rods 4 and 4', a convex lens 6 being mounted on the lens frame 5. Rods 7, 7' and said lens frame 5 are connected by rods 8, 8' so that the rods 8,8' can be slidingly moved by means of the rods 7,7'.

While a solar cooker assembly of the prior art can be easily hauled on an automobile roof since it is collapsible, such a solar cooker has not become popular because it is accompanied by a grave disadvantage of being normally too heavy to be handled for loading and unloading or to be carried by men without difficulty.

Meanwhile, a Fresnel lens has been known as a lightweight and a highly transmissible concave lens that affords a high focusing effect and a reduction of the amount of required material.

However, a Fresnel lens is accompanied by a serious disadvantage of being liable to deflections or warpage so that materials to be cooked can not be subjected to the desired temperature since a Fresnel lens normally has a very flat configuration and can be easily deflected or warped by heat.

SUMMARY OF THE INVENTION

It is therefore an object of the present invention to provide a cooker assembly that utilizes solar energy and affords materials for cooking at any desired temperature.

It is another object of the present invention to provide a solar cooker assembly that comprises a Fresnel lens having such a high rigidity that it is not deflected by wind and/or fluctuations of ambient temperature.

It is still another object of the present invention to provide a solar cooker assembly that is lightweight and can be disassembled, reassembled and transported without difficulty.

Other objects and the advantages of the present invention will become apparent in the following description which is made by referring to the accompanying drawings.

BRIEF DESCRIPTION OF THE DRAWINGS

In the accompanying drawings,

FIG. 7(a) is a plan view of another type of Fresnel lens to be used for a solar cooker assembly according to the present invention and FIG. 7(b) is a plan view of the Fresnel len of FIG. 7(a) in a folded condition, while

DETAILED DESCRIPTION OF THE PREFERRED EMBODIMENTS OF THE INVENTION

The inventors of the present invention, as a result of intensive research efforts, discovered that a Fresnel lens having a smoothly outwardly rounded sectional view shows an excellent rigidity and is free from any deflection or warpage that can be caused by wind and/or fluctuations of ambient air so that a solar cooker assembly utilizing such a Fresnel lens has an excellent high temperature-resisting capability and therefore can heat materials for cooking up to any desired temperature.

In other words, according to the present invention, there is provided a cooker assembly comprising a circular and convex Fresnel lens having its convex side facing either upward or downward, a protective frame unit rigidly fitted to the periphery of said Fresnel lens, a support unit for swingably supporting said Fresnel lens so that the elevation and the azimuth of the lens can be freely selected without restriction and a cooking unit can be located at the focal point of said Fresnel lens.

A convex Fresnel lens that can be used for a solar cooker assembly according to the present invention is preferably made from members having a reduced thickness and pitch. While such an improved Fresnel lens has a reduced weight per unit area when it is put to use, its peripheral portion will inevitably become too frail to be directly connected with the support unit. With a view to avoiding this problem, a particular lens frame is provided for a Fresnel lens to be used for a solar cooker assembly according to the invention in order to protect the peripheral portion of the lens and to receive the connector of the support unit.

While a convex Fresnel lens to be used for a solar cooker assembly according to the invention is formed with methacrylic resin by injection molding, it may also be prepared by using a casting or high temperature press technique.

Now the present invention will be described in greater detail by referring to the accompanying drawings.

Figure 1A:
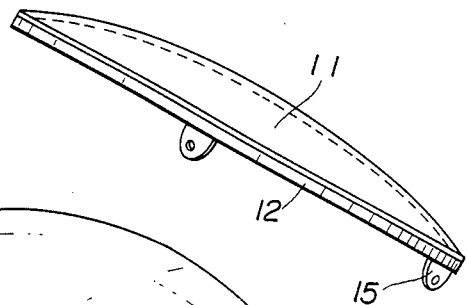
FIG. 1(a) is a side view of a type of Fresnel lens assembly to be used for a solar cooker assembly according to the present invention and FIG. 1(b) is a perspective view of an embodiment of the solar cooker assembly according to the present invention.
Figure 1B:
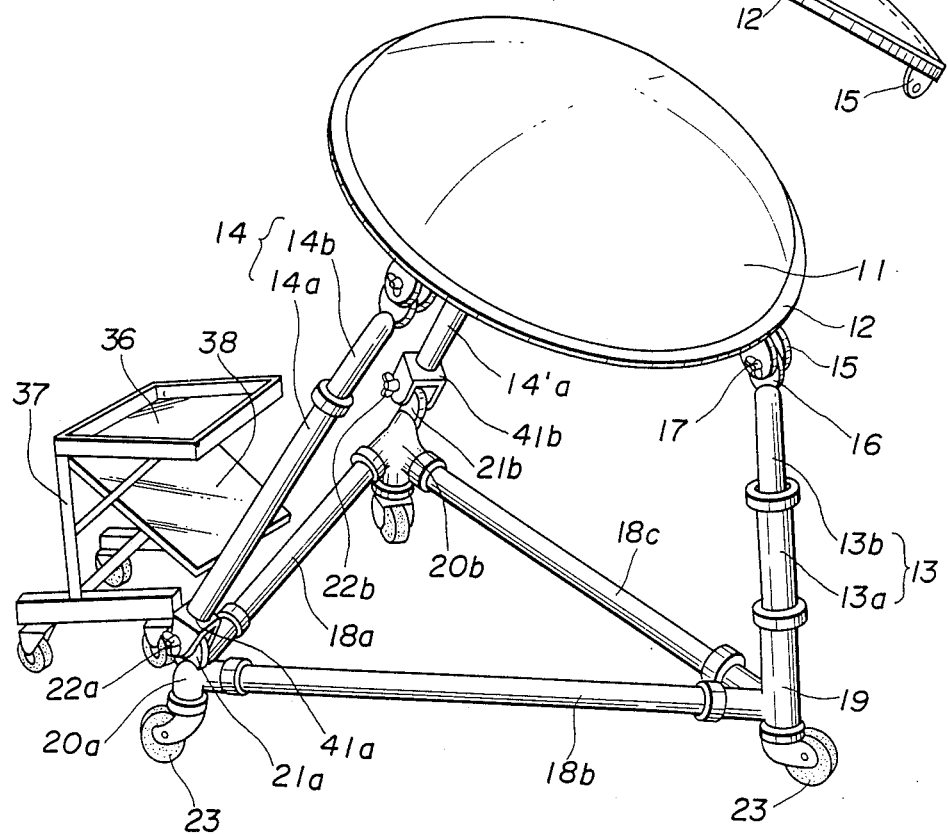

FIG. 1(a) shows a side view of a Fresnel lens to be used for an embodiment of the solar cooker assembly according to the present invention, whose perspective view is illustrated in FIG. 1(b).

The Fresnel lens 11 in FIG. 1(a) is facing upwardly and provided with a lens frame 12 around its periphery.

The lens frame 12 is tiltably supported by a front support pillar 13 and a pair of rear lateral support pillars 14, 14' and each of the support pillars consists of two pillar members which are telescopically engaged with each other as is illustrated by pillar members 14a and 14b of pillar 14.

The lens frame 12 is securely fitted to the support unit by means of bifurcated fitting members 15, each of which holds between its branches a corresponding fitting member 16 located at the top of a support pillar of the support unit, the two matching fitting members being connected together by means of a thumbscrew.

The support pillars are respectively held standing by corresponding couplings 19, 20a, 20b provided at the respective corners of a triangular base formed by three rods 18a, 18b, 18c. More specifically, the front support pillar 13 is removably engaged with a standing member of a three-pronged coupling 19, while the lateral rear support pillars 14, 14' are held standing by respective two-pronged couplings 20a, 20b as bifurcated fitting members 41a, 41b of the rear support pillars 14, 14' located at the bottom thereof are respectively engaged with corresponding fitting members 21a, 21b provided at the corner of the two-pronged couplings 20a, 20b. The fitting members 21a, 21b are respectively securely and swingably fitted to the corresponding bifurcated fitting members 41a, 41b by means of thumbscrew 22. Reference numeral 23 in FIG. 1(b) denotes azimuth adjusting wheels which are held at the bottom of the respective couplings.

With an arrangement of a Fresnel lens unit having a telescopic front support pillar 13 as described above, the focal point of the lens can be always maintained above the ground level by elongating the front pillar 13 in order to bring the lens to a high position even when the sun is elevated up in the sky and the Fresnel lens has to be held in a almost or completely horizontal position to adequately receive beams of the sun. To the contrary, when the sun is found near the horizon, the lens should be held low in order to keep the local point low so that the cooking unit which is located at the focal point of the lens is kept low enough to avoid any inconvenience of the user. Such a low position of the focal point can be realized by reducing the length of the front support pillar 13 as well as that of the rear lateral support pillars 14, 14'.

In a lens unit as described above and to be used for a solar cooker assembly according to the invention, the lens frame 12 and the couplings 20a, 20b of the base are connected in such a manner that the angle between the frame and the base is always kept adjustable. In other words, the length of the rear lateral support pillars can be adjusted by adequately tilting them in accordance with the desired elevation of the Fresnel lens.

Figure 2:
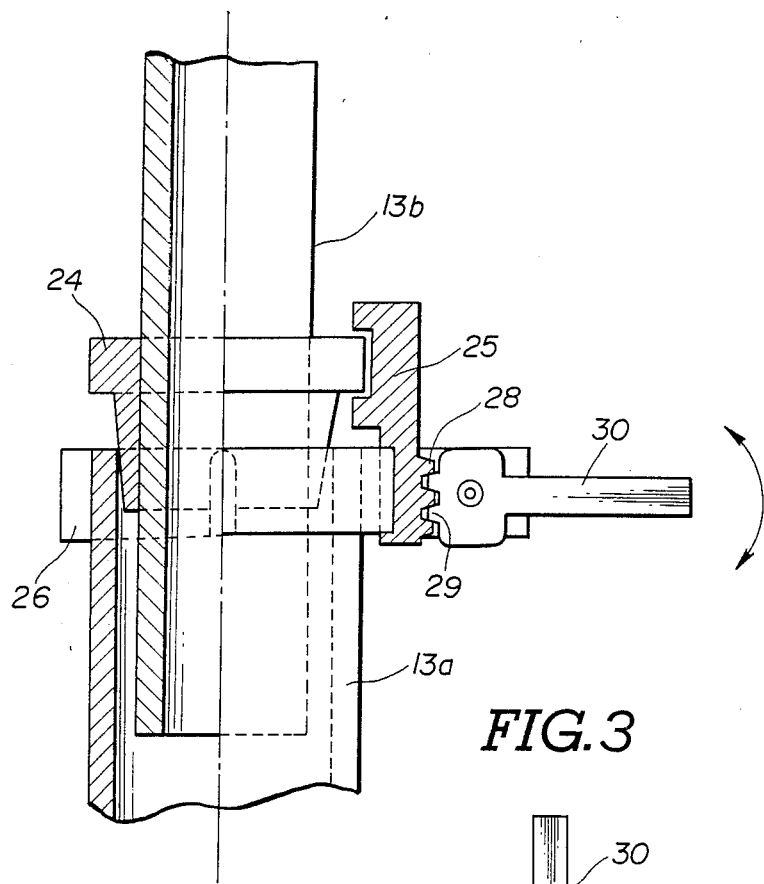
FIG. 2 is a partial sectional view of a support unit to be used for the embodiment of FIG. 1(b), illustrating the method of connection thereof.
Figure 3:
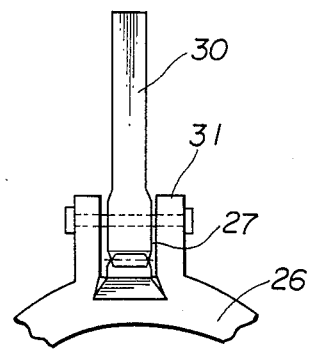
FIG. 3 is a plan view of the support unit of FIG. 2.
Figure 4:
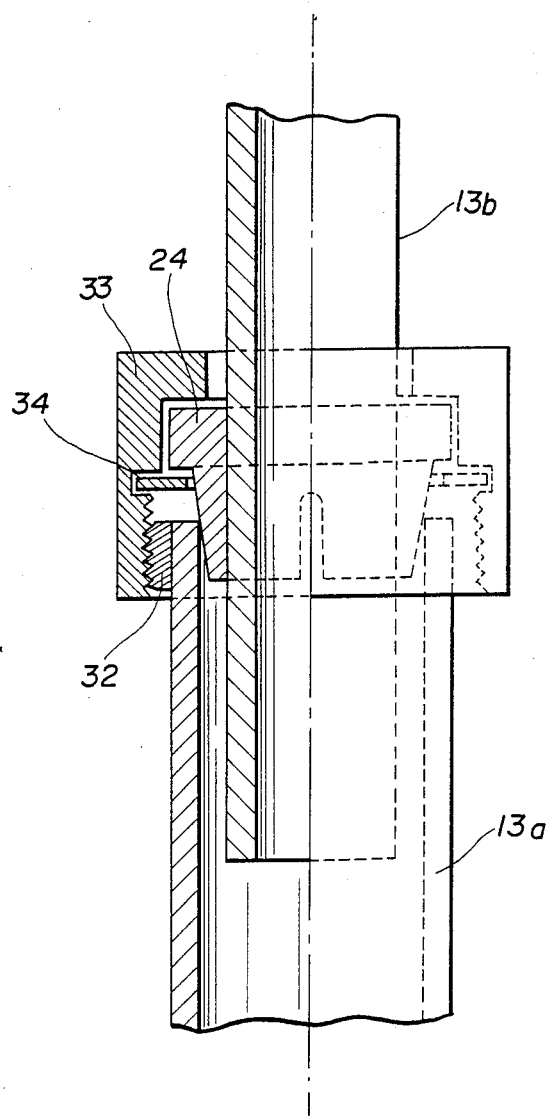
FIGS. 4 and 5 are partial sectional views of the support unit of FIG. 2, illustrating the method of connection thereof.
Figure 5:
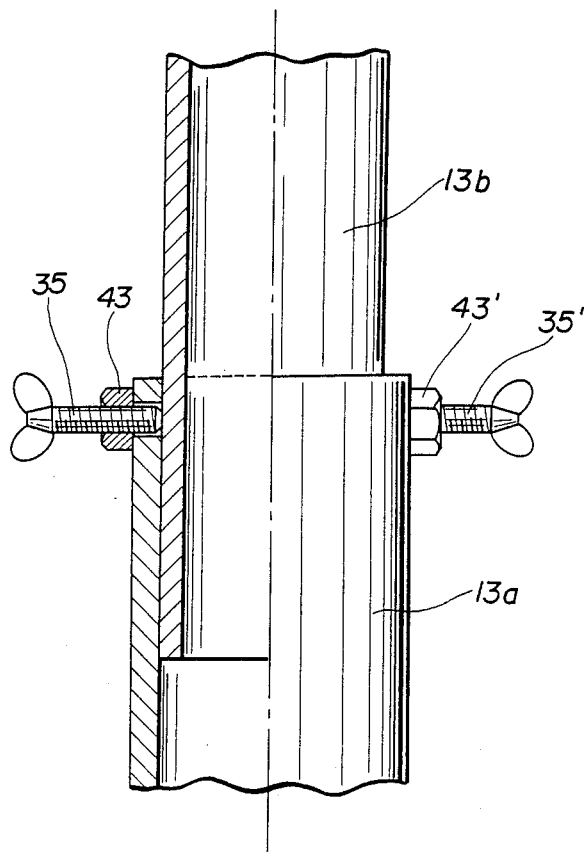

Each of the support pillars of the support unit is telescopic and comprises two pillar membes which are slidingly movable relative to each other. More specifically, a smaller diameter pillar member 13b is slidingly located in a larger diamger pillar member 13a and a tapered ring 24 is placed therebetween as illustrated in FIG. 2 so that the two pillar members 13a and 13b can be brought to a locked condition or released from that condition by respectively pushing down or up the tapered ring 24. The tapered ring 24 can be pushed down or up to lock or unlock the two pillar members by moving down or up a reciprocating plate 25, which is rigidly holding the tapered ring 24, along a U-shaped axial guide groove 27 formed in a ring 26 rigidly fitted to the larger diameter pillar member. In turn, the reciprocating plate 25 can be moved down or up by vertically rotating a handle 30 by 90°, as said handle 30 is provided with teeth 29 at its one end so that they are engaged with the corresponding teeth 28 provided on the reciprocating plate 25. The handle 30 is rotatably fitted to the side walls 31 of said U-shaped guide groove by means of a shaft. Alternatively, as illustrated in FIG. 4, a threaded ring 32 may be rigidly fitted to the top portion of the periphery of a larger diamter pillar member 13a which telescopically holds a smaller diamter pillar member 13b and a tapered ring 24 in such a manner that a clamp nut 33 is engaged with the ring 32 and the pillar members are locked or unlocked by rotating the clamp nut 33. More specifically, with such an arrangement, when the clamp nut 33 is rotated to lock the pillar members, the tapered ring 24 is revolved to edge into the space between the two pillar members and when the clamp nut 33 is rotated reversely to unlock the pillar members, the tapered ring 24 is revolved to edge away from the space between the pillar members as it is pushed up by a E-ring 34 placed in a recess provided inside of said clamp nut 33. Still alternatively, as illustrated in FIG. 5, a threaded radial throughbore may be formed at a top portion of a large diameter pillar member and a pair of nuts 43, 43' may be welded to the opposite openings of the bore so that a pair of clamp bolts 35, 35' may be screwed into said throughbore to rigidly hold a smaller diamter pillar member by pressing it from opposite sides.

As illustrated in FIG. 1, a cooking table 36 is supported by a support frame 37. Although the cooking table 36 may take the form of a saucepan or a frying pan, most preferably it is realized in the form of a flat iron plate lined with a heat insulating material or a heat storing material.

While the focal point of the Fresnel lens may directly hit the cooking table 36, preferably a mirror 38 is rigidly fitted to a mirror fixture located below the cooking table in such a way that the light that has been focused by the Fresnel lens strikes the back surface of the cooking table 36 and the orientation of the mirror 38 can be adjusted in terms of the distance from and the angle relative to the Fresnel lens. Such an arrangement is particularly effective when the sun is located near the horizon.

Figure 6:
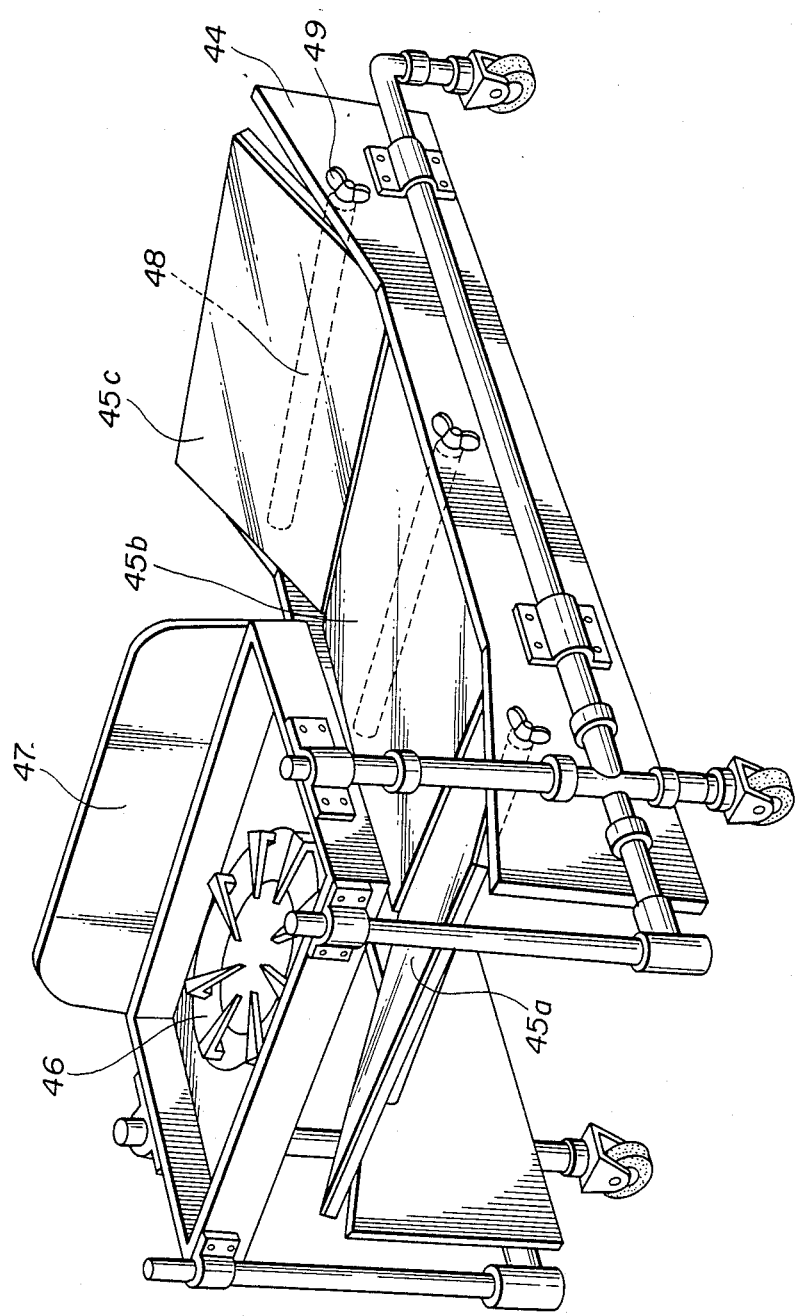
FIG. 6 is a perspective view illustrating another type of cooker unit.

FIG. 6 illustrates another type of cooker unit to be used for a solar cooker assembly according to the invention. This cooker unit comprises a support frame 44 constituting the lower part of the cooker unit and mirrors 45a, 45b, 45c which are securely fitted on said support frame 44 in such a manner that each of them can be independently tilted to any desired angle. The unit also comprises a cradle 46 provided for receiving a cooking utensil. Reference numeral 47 in FIG. 6 denotes a shield plate designed to avert any light that comes from the Fresnel lens and can hit a person or persons standing nearby.

A shaft 48 which is pivotably supported by the support frame 44 is rigidly fitted to the lower surface of each of the mirrors and a thumbscrew 49 is engaged into an end portion of said shaft which is projecting from the support frame 44 in such a manner that the mirror can be rigidly held to any desired angle by means of said thumbscrew 49 once the mirror is set to that angle.

With an arrangement of mirrors as described above, the beams of the sun that have been focused by the Fresnel lens can be advantageously received by appropriately selected one of the mirrors by suitably adjusting its angle regardless of the position of the sun in the sky, if it is immediately after a sunrise, at noon or shortly before sunset. It should be noted that, whereas an embodiment as shown in FIG. 1 can not accommodate a condition where the beams of the sun from the Fresnel lens perpendicularly hits the ground surface as in the case of an area located on the equator at or around noon when the sun is directly above, an arrangement as described above can satisfactorily be used under such a condition as one of the mirrors can be placed directly under the Fresnel lens and the cooking table can be heated from the back side.

Figure 7B:
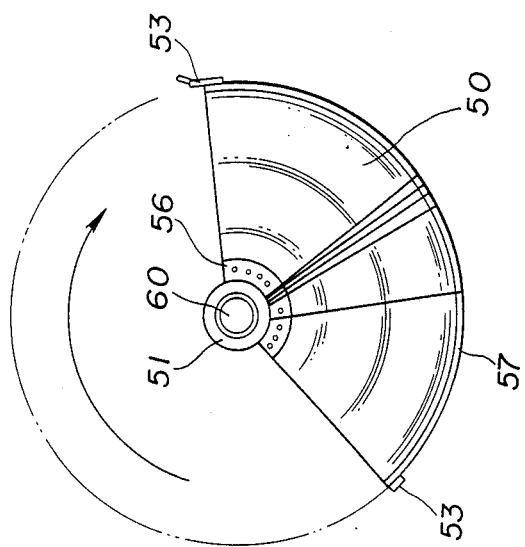
Figure 7C:
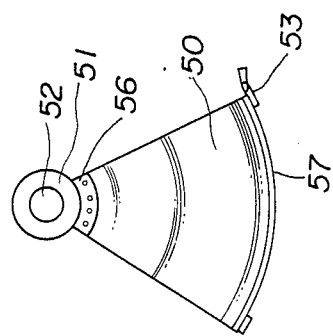
FIG. 7(c) is a plan view of a sectoral component of the Fresnel lens of FIG. 7(a).
Figure 7A:
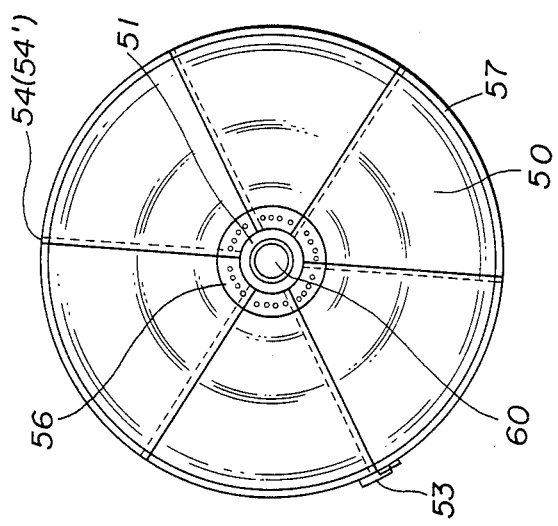

In FIGS. 7(a) through 7(c) which illustrate another type of Fresnel lens to be used for a solar cooker assembly according to the invention, FIG. 7(c) shows a sectoral Fresnel lens component 50 connected to a core member 51 by means of fixtures 60 that run through connector holes 52 so that a circular Fresnel lens is formed when a total of six components are assembled and the two extreme sectoral components are connected together by means of a hook fastner 53 as shown in FIG. 7(a) so that the Fresnel lens is completely unfolded to take a round shape for use.

Each of the Fresnel lens components is provided with an recessed side edge 54 and a protruding side edge 54' so that any neighboring two lens components come to be adequately engaged with each other when the lens is fully unfolded. Each of the Fresnel lens components is rigidly fitted to the metal core member 51 by means of connector screws 56. Reference numeral 57 denotes curved protective frames, each of which is fitted to the outer edge of each of the sectoral components to reinforce the rigidty of the thin Fresnel lenses.

When a Fresnel lens configured as described above is not in use, it can be folded in a manner as shown in FIG. 7(b) to take a compact form which is sufficiently adequate for transportation.

Figure 8:
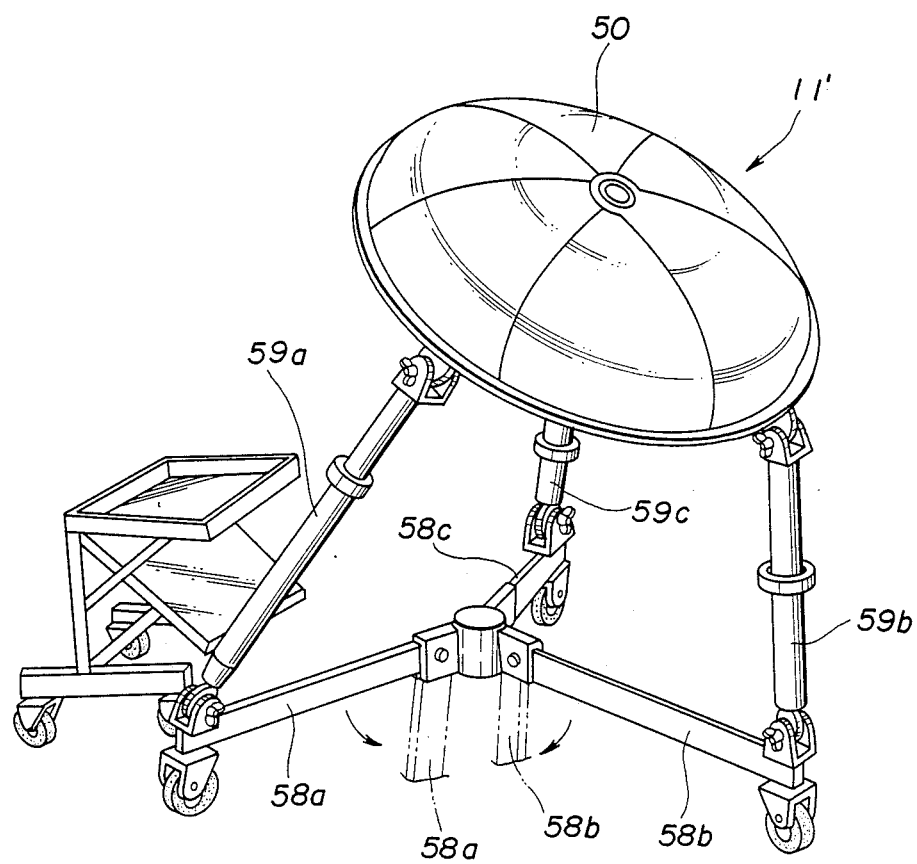
FIG. 8 is a perspective view of a still another type of Fresnel lens unit to be used for a solar cooker assembly according to the present invention.
Figure 9:
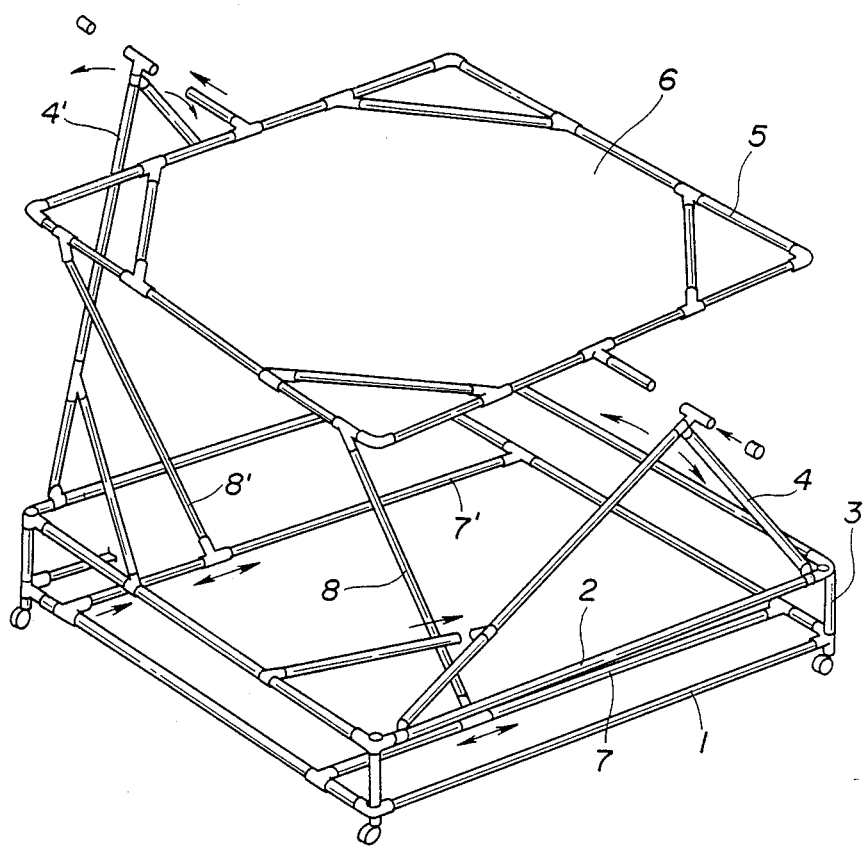
FIG. 9 is a perspective view of a solar cooker of the prior art.

FIG. 8 is a perspective view of another embodiment of the solar cooker assembly of the present invention, wherein a circular Fresnel lens 11' is constructed by connecting a number of sectoral Fresnel lens components and support pillars 59a, 59b, 59c are held standing at the corresponding outer ends of a three-pronged base whose articulate rod branches are radially arranged around a center member with an equal angular distance.

This embodiment is particularly advantageous for assemblage and transportation because the rods 58a, 58b, 58c of the base can be pivoted downwardly.

As described above, a solar cooker assembly according to the present invention utilizes a convex Fresnel lens which is lightweight, easy to carry and free from lateral deformation due to fluctuation of temperature and to high winds so that it can heat a cooking utensil to any desired temperature. Moreover, since support pillars for supporting a Fresnel lens and a base for bearing the support pillars can be dismantled or folded, a cooker assembly according to the invention may be disassembled, reassembled and transported with ease.

What is claimed is:

1. A solar cooker assembly comprising a circular and convex Fresnel lens having its convex side facing either upward or downward, a protective frame unit rigidly fitted to the periphery of said Fresnel lens, a support unit for swingably supporting said Fresnel lens so that the elevation and the azimuth of the lens can be freely chosen without restriction, said support unit comprising three support pillars which are held standing at corresponding respective corners of a triangular base formed by combining three rods, each of the support pillars being constituted by a plurality of pillar members vertically and telescopically engaged with each other, and a cooking unit located at the focal point of said Fresnel lens.

2. A solar cooker assembly according to claim 1, wherein said Fresnel lens comprises a plurality of sectoral Fresnel lens components foldably connected to a core member at their inner end, and said convex Fresnel lens being formed by completely unfolding said sectoral Fresnel lens components.

3. A solar cooker assembly according to claim 1, wherein a mirror is further provided below said cooking unit in such a manner that the beams of the sun coming through the Fresnel lens are reflected by the mirror and hit the back side of a cooking utensil located in position.

4. A solar cooker assembly according to claim 3, wherein a plurality of mutually connected but independently tiltable mirrors are provided.

5. A solar cooker assembly according to claim 4, wherein each sectoral Fresnel lens component has a recessed side edge and a protruding side edge, adjacent sectoral Fresenel lens components having a recessed side edge engaging with a protruding side edge when said Frensnel lens is unfolded.

* * * * *